United States Patent
Ishiguchi

(10) Patent No.: US 7,208,713 B2
(45) Date of Patent: Apr. 24, 2007

(54) LIGHT SOURCE UNIT AND DISPLAY DEVICE HAVING LUMINANCE CONTROL BASED UPON DETECTED LIGHT VALUES

(75) Inventor: Kazuhiro Ishiguchi, Kikuchi-gun (JP)

(73) Assignee: Advanced Display Inc., Kumamoto (JP)

( * ) Notice: Subject to any disclaimer, the term of this patent is extended or adjusted under 35 U.S.C. 154(b) by 254 days.

(21) Appl. No.: 10/673,369

(22) Filed: Sep. 30, 2003

(65) Prior Publication Data

US 2004/0113044 A1 Jun. 17, 2004

(30) Foreign Application Priority Data

Dec. 13, 2002 (JP) ............... 2002-361568

(51) Int. Cl.
- *G01G 1/32* (2006.01)
- *G09G 3/30* (2006.01)
- *G09G 5/00* (2006.01)
- *G09G 5/10* (2006.01)
- *H05B 37/02* (2006.01)

(52) U.S. Cl. ............ 250/205; 345/81; 345/207; 345/690; 315/309

(58) Field of Classification Search ............ 250/205; 348/602; 345/207, 76–83, 690; 315/309
See application file for complete search history.

(56) References Cited

U.S. PATENT DOCUMENTS

| | | | | |
|---|---|---|---|---|
| 5,406,172 A | * | 4/1995 | Bennett | 315/112 |
| 5,831,686 A | * | 11/1998 | Beretta | 348/602 |
| 6,127,783 A | * | 10/2000 | Pashley et al. | 315/149 |
| 6,521,879 B1 | * | 2/2003 | Rand et al. | 250/205 |
| 6,547,400 B1 | | 4/2003 | Yokoyama | |
| 6,960,759 B2 | * | 11/2005 | Konagaya | 250/238 |
| 6,998,594 B2 | * | 2/2006 | Gaines et al. | 250/205 |
| 2001/0008395 A1 | * | 7/2001 | Yamamoto et al. | 345/102 |
| 2002/0097000 A1 | * | 7/2002 | Muthu et al. | 315/169.3 |

FOREIGN PATENT DOCUMENTS

| JP | 2000-301748 | 10/2000 |
|---|---|---|
| KR | 2001-0022668 | 3/2001 |

* cited by examiner

*Primary Examiner*—Thanh X. Luu
*Assistant Examiner*—Brian Livedalen
(74) *Attorney, Agent, or Firm*—Oblon, Spivak, McClelland, Maier & Neustadt, P.C.

(57) ABSTRACT

A light source unit includes a light source having LED chips for emitting different colors of light and an optical sensor for detecting light from a light mixer. A light source control section controls by feedback control luminance of each of the LED chips according to values detected by the optical sensor. The light source unit also includes a temperature control section for controlling the temperature of the light source. The temperature control section is a feedback control system. Keeping the light source at a constant temperature allows suppressing spectrum changes of the LED chips with temperature, thereby suppressing changes in the luminance and chromaticity of the light source unit.

12 Claims, 3 Drawing Sheets

LIGHT SOURCE UNIT AND DISPLAY DEVICE HAVING LUMINANCE CONTROL BASED UPON DETECTED LIGHT VALUES

BACKGROUND OF THE INVENTION

1. Field of the Invention

The present invention relates to a light source unit and a display device, and more specifically, to a light source unit and a display device capable of effective control of a light source comprising a plurality of light source elements with different emission frequencies.

2. Description of the Related Art

Liquid crystal display devices have become widely used as image display devices for personal computers and various types of monitors. Liquid crystal display devices generally include a liquid crystal display panel and a backlight unit mounted on the back of the panel. Liquid crystal display panels display images by controlling transmission of light. Backlight units generally include a light source and a plurality of optical components for effectively emitting the light from the light source toward the liquid crystal display panel. Cold cathode fluorescent lamps (CCFLs) and light emission diodes (LEDs) are well-known light source elements.

LEDs are increasingly employed as the light source in the backlight unit because they have better color characteristics than CCFLs. A plurality of LED chips emitting different colors of light are often used as light source elements. General techniques use three types of LED chips emitting red (R), green (G), and blue (B) light and adjust the luminance of each color LED, thereby achieving a light source unit emitting a desired color of light. The luminance of LED chips is adjusted to produce white light when the LED chips are used for a backlight unit of a liquid crystal display device. The use of LEDs emitting different colors of light requires mixing light from each LED to create a desired color of light.

LED chips are point light source elements emitting highly directional light. There are is various techniques for mixing light from LEDs. A typical method uses a light guide plate. The light emitted by each color of LED chip enters a light guide plate and travels through the plate as being diffused, thereby being mixed with each other. Though LEDs have good color characteristics, they have somewhat instable emission characteristics. Especially, the emission characteristics of LEDs change over time and temperature. More specifically, luminance decreases with time, and luminance varies and emission frequency shifts with temperature. Accordingly, the luminance or chromaticity of a light source unit varies with time or temperature.

Therefore, when using LEDs for a light source, it is necessary to use an optical sensor to detect the light from the LEDs and control the luminance of each LED. It is required that normally the luminosity curve of an optical sensor is the same as the human luminosity curve. Such a sensor, however, is hard to manufacture and hence it is difficult to obtain an optical sensor with desired properties.

Known as a typical sensor whose detection sensitivity changes with frequency is an optical sensor having a bandpass filter. Though sensors with the bandpass filter can detect a change in a luminance level within a wavelength band, it cannot accurately detect a change in spectrum (change in color) within the band. This is because the optical sensor detects the sum of all the wavelengths of light within the wavelength bandwidth of the band pass filter, not the intensity of each light with the wavelength within the bandwidth.

As described earlier, LEDs have such characteristics that spectrum changes by emission wavelength shifts in accordance with temperature changes. The wavelength shifts result in changes in the chromaticity or luminance of the light source unit. The optical sensor with the bandpass filter, however, is incapable of accurately detecting the changes.

Another light source element whose emission characteristics change with temperature is an ultraviolet lamp. The ultraviolet lamp is used for a light source of a thermal printer, for example. Japanese Unexamined Patent Application Publication No. 2000-301748 describes a technique that controls the temperature of the ultraviolet lamp to improve the printing characteristics of color thermal printers. The luminance of the ultraviolet lamp is low at low bulb temperature, increases as the temperature rises, and eventually decreases when the temperature reaches a certain point. The bulb temperature is therefore required to be within a given range to maintain a constant luminance. The use of a cooling fan to cool the ultraviolet lamp allows the bulb temperature to be kept within a given temperature range.

The cooling fan may be controlled with a temperature sensor to measure a bulb temperature. Or, it may be controlled according to the luminance of the ultraviolet lamp detected by a plurality of illuminance sensors. This technique allows more accurate detection of emission characteristics of ultraviolet lamps and prevention of luminance gradient of a linear lamp. However, though this technique can control a light source emitting monochromatic light, it cannot effectively control a light source comprising a plurality of light source elements emitting different wavelengths of light such as a white light source unit comprising LEDs.

SUMMARY OF THE INVENTION

Accordingly, an object of the present invention is to provide a light source unit and a display device capable of effective control of a light source comprising a plurality of light source elements emitting different wavelengths of light.

The first light source unit according to the present invention has a light source comprising a plurality of light source elements for emitting different wavelengths of light; a temperature controller for keeping the light source at constant temperature; and a light mixer for mixing light emitted by the plurality of light source elements. The first light source unit also has a light detector for detecting light from the light mixer capable of detecting a plurality of different wavelengths of light; and a light source controller for controlling luminance of each of the plurality of light source elements based on values detected by the light detector. In this configuration, the light source unit is capable of effective control of the light source comprising the plurality of light source elements emitting different wavelengths of light.

In the first light source unit, the light detector may detect a plurality of different wavelength ranges, and the light source controller may control luminance of each of the plurality of light source elements so that each detected value in the plurality of wavelength ranges approaches each given value. This configuration allows suppression of spectrum changes in a detectable wavelength range, thereby effectively controlling the light source comprising the plurality of light source elements.

The first light source unit may further have a temperature detector for detecting temperature of the light source, and the temperature controller may operate so that a value detected by the temperature detector approaches a given value. This configuration allows suppression of spectrum changes of the light source.

In the first light source unit, the temperature controller may operate to keep the light source constant at constant temperature, and the light source controller may control luminance of each of the plurality of light source elements so that the light source unit has substantially constant chromaticity. This configuration allows suppression of spectrum changes of the light source, thereby effectively suppressing a change in chromaticity of the light source unit.

The first light source unit may further have a temperature detector for detecting temperature of the light source. The temperature controller may change a temperature value to be maintained in the light source based on a temperature value detected by the temperature detector. The light source controller may control each of the plurality of light source elements to have luminance corresponding to the temperature value to be maintained. This configuration allows effectively controlling the light source in accordance with spectrum changes caused by changes in the temperature of the light source.

The second light source unit according to the present invention has a light source comprising a plurality of light source elements for emitting different wavelengths of light; and a light mixer for mixing light emitted by the plurality of light source elements. The second light source unit also has a light detector for detecting light from the light mixer capable of detecting a plurality of different wavelengths of light; a temperature detector for detecting temperature of the light source; and a light source controller for controlling luminance of each of the plurality of light source elements based on values detected by the light detector. In this configuration, the light source unit is capable of effective control of the light source comprising the plurality of light source elements emitting different wavelengths of light.

In the second light source unit, the light source controller may control luminance of each of the plurality of the light source elements based on a change in a value detected by the temperature detector so as to suppress a change in chromaticity of the light source unit. This configuration allows effectively controlling the light source in accordance with spectrum changes caused by changes in the temperature of the light source.

In the first or second light source unit, the light source may comprise a plurality of light source elements emitting light with wavelengths corresponding to each of N (N is a natural number) number of colors, and the light detector may comprise N number of optical sensors corresponding to each of N number of colors. The light source controller may control each of the plurality of light source elements so that each value detected by the N number of optical sensors approaches each given value. This configuration allows more accurate control of the light source.

In the second light source unit, the light source controller may control each of the plurality of light source elements to emit light with luminance corresponding to a temperature value detected by the temperature detector. This configuration allows effectively controlling the light source in accordance with spectrum changes caused by changes in the temperature of the light source.

The first display device according to the present invention has a light source unit and a display panel for displaying images by controlling light emitted by the light source unit. The light source unit has a light source comprising a plurality of light source elements for emitting different wavelengths of light; a temperature controller for keeping the light source at constant temperature; and a light mixer for mixing light emitted by the plurality of light source elements. The light source unit also has a light detector for detecting light from the light mixer capable of detecting a plurality of different wavelengths of light; and a light source controller for controlling luminance of each of the plurality of light source elements based on values detected by the light detector. In this configuration, the display device is capable of effectively controlling the light source in accordance with spectrum changes caused by changes in the temperature of the light source.

The second display device according to the present invention has a light source unit and a display panel for displaying images by controlling light emitted by the light source unit. The light source unit has a light source comprising a plurality of light source elements for emitting different wavelengths of light; and a light mixer for mixing light emitted by the plurality of light source elements. The light source also has a light detector for detecting light from the light mixer capable of detecting a plurality of different wavelengths of light; a temperature detector for detecting temperature of the light source; and a light source controller for controlling luminance of each of the plurality of light source elements based on values detected by the light detector. In this configuration, the display device is capable of effectively controlling the light source in accordance with spectrum changes caused by changes in the temperature of the light source.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Possible embodiments to which the present invention may be applied will be explained hereinafter in detail. The invention will be described with respect to only a few of several embodiments, and it is understood that equivalent alterations and modifications will occur to those skilled in the art. In the following description, simplification or modification of structures and measurements are made to clarify the description.

First Embodiment

The first embodiment controls the temperature of a light source comprising a plurality of light source elements emitting different wavelengths of light. This embodiment keeps the light source unit at constant temperature or temperatures and thereby effectively controls the luminance and chromaticity of the light emitted by the light source elements.

Figure 1:
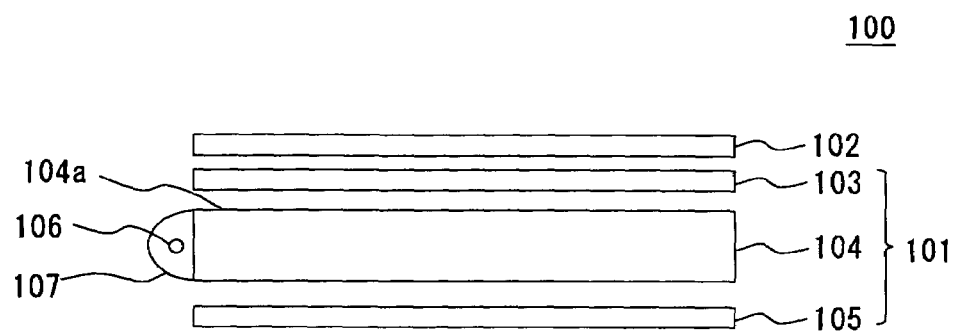
FIG. 1 is a sectional view showing a schematic structure of a light crystal display device according to the first embodiment of the present invention.

FIG. 1 is a sectional view to explain an overall structure of a liquid crystal module according to this embodiment. It shows a schematic structure of a liquid crystal display module 100 having a sidelight type backlight unit. The liquid crystal display module 100 includes a backlight unit 101 and a liquid crystal display panel 102 with driver circuits (not shown). The backlight unit 101 has an optical sheet 103 such as a prism sheet for collecting light to increase the front luminance, a diffusion sheet for diffusing transmitted light to achieve the uniform surface luminance, and the like. The backlight unit 101 also has a light guide plate 104 for guiding and diffusing the light from a light source and a reflection sheet 105 for reflecting incident light.

At the side of the light guide plate 104 is mounted a light source 106 comprising a plurality of light source elements emitting different wavelengths (colors) of light. The light source elements are generally light emitting diodes (LEDs). The elements are, however, not limited to LEDs, and they may be other elements emitting different wavelengths of light such as organic electroluminescence (EL) and inorganic EL. The light source 106 is surrounded by a lamp reflector 107 for reflecting the light from the light source 106. The liquid crystal display panel 102 and other optical components are contained in a frame, and supported and protected by a bezel placed above the display panel. The backlight unit 101 includes the optical sheet 103, light guide plate 104, reflection sheet 105, and light source 106.

The liquid crystal display panel 102 has a display area composed of a plurality of pixels arranged in a matrix, and a peripheral area surrounding the display area. The liquid crystal display panel 102 includes an array substrate with TFT array circuits and a counter substrate between which liquid crystals are filled. A color liquid crystal display device has a color filter including red, green, and blue sections. Each pixel in the display area of the liquid crystal display panel 102 displays one of red, green, and blue. In a black and white display device, a pixel displays white or black. A plurality of signal lines and gate lines are formed in a matrix in the display area on the array substrate. The signal lines and the gate lines cross each other at substantially right angles.

Pixels are selected according to a gate voltage from a gate driver IC (not shown), and an electric field is applied to liquid crystals of the selected pixel according to a display signal voltage from a source driver IC (not shown). A voltage input by the source driver IC is sent to a pixel electrode via a source and drain of a TFT, and the pixel electrode and a common electrode apply an electric field to the liquid crystals. Changing the voltage results in changing the applied voltage to the liquid crystals, thereby controlling light transmittance of the liquid crystals. A circuit to supply a common electric potential to the common electrode is constructed on a control circuit substrate (not shown). Besides the active matrix type described above, there is a passive matrix type liquid crystal display panel with no switching element. The present invention is applicable to various types of liquid crystal display panels. It is also applicable to various types of display devices in which a display panel controls the light from a planar light source unit.

The optical operation of the backlight unit 101 will be explained hereinbelow. The light emitted by the light source 106 enters the light guide plate 104 directly or after reflected by the lamp reflector 107. While traveling through the light guide plate 104, the different wavelengths of light are diffused and mixed with each other. The mixed light exits from the light guide plate 104 through a light exit surface 104a that is the top surface of the light guide plate 104 shown in FIG. 1. The light then passes through the optical sheet 103 and enters the liquid crystal display panel 102. Though this embodiment employs the light guide plate 104 as a means to mix different wavelengths of light from the light source 106, the light guide plate 104 can be replaced by another optical component or an air layer.

Figure 2:
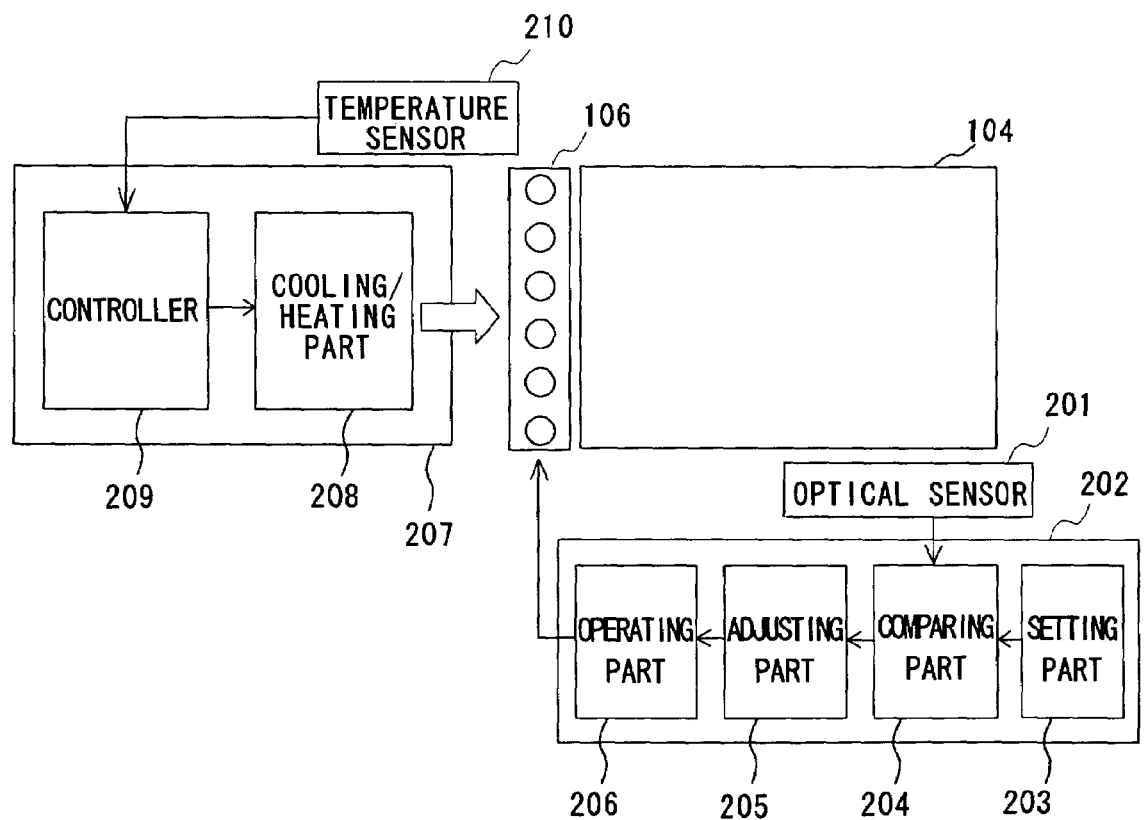
FIG. 2 is a block diagram showing a schematic structure of the light source unit according to the first embodiment of the present invention.

FIG. 2 is a plan view to explain a schematic structure of a sidelight type backlight unit that is a light source unit according to this embodiment. In FIG. 2, the same reference symbols as in FIG. 1 designate the same elements and redundant description will be omitted. The backlight unit in FIG. 2 has an optical sensor 201 for detecting the light from the light guide plate 104 and a light source control section 202 for controlling the light source 106. The light source control section 202 is a feedback control system including a setting part 203, comparing part 204, adjusting part 205, and operating part 206. The backlight unit also has a temperature sensor 210 for detecting the temperature of the light source 106 and a temperature control section 207 for controlling the temperature of the light source 106. The temperature control section 207 includes a cooling/heating part 208 for maintaining the temperature of the light source 106 by cooling and/or heating the light source 106 and a controller 209 for controlling the cooling/heating part 208.

This embodiment describes a case where LEDs are used as light source elements. The backlight unit 101 has the light source 106 comprising a plurality of LED chips emitting different wavelengths of light. Three types of LED chips emitting red (R), green (G), and blue (B) light are generally mounted. The number and position of each color LED chips are determined to produce the light with a desired chromaticity and luminance. The light source is not restricted to comprise the R, G, and B LED chips, but may comprise other colors of LED chips.

Further, the light source is not limited to comprise the three types of LED chips emitting three different wavelengths of light, but may comprise two or more than three types of LED chips emitting different wavelengths of light. The light source unit preferably has the light source comprising more than two colors of light source elements so as to emit light with various chromaticity. The light source preferably comprises three colors of light source elements for easier control and smaller number of kinds of parts. The light source unit of a display device preferably has the light source comprising three colors of light source elements capable of producing white light.

The optical sensor 201 detects the light from the light guide plate 104 that is a light mixer where light is mixed together. Preferably, the optical sensor 201 detects the light exiting through the side surface of the light guide plate 104. The optical sensor 201 can detect a plurality of different wavelengths of light. The optical sensor 201 may comprise a plurality of optical sensor elements 201a, 201b and 201c for detecting different wavelengths of light. Each of the optical sensor elements can detect the intensity of light in a wavelength range with a given bandwidth. The optical sensor 201 comprises the optical sensor elements whose detectable wavelength ranges are different from each other. The wavelength of each light source element of the light source 106 is within the detectable wavelength range of at least one optical sensor element. The detectable wavelength range of each optical sensor element includes the wavelength of at least one light source element. The number of types of the light source elements is generally equal to that of the optical sensor elements. For example, three types of optical sensor elements with bandpass filters corresponding to three colors of light may be used for the light source comprising three colors of LEDs. The number of optical sensor elements, however, may be greater or smaller than the number of different frequencies emitted by the light source elements of the light source 106 as long as the luminance and chromaticity of the light source elements can be controlled. It is also possible to use a single optical sensor time-divisionally to detect the intensity of different wavelengths of light.

Based on the values detected by the optical sensor 201, the light source control section 202 controls the luminance of each light source element of the light source 106 with feedback control action. The luminance of each light source element is controlled so that the detected value approaches a given level. The given level may be a specific value or a specific range. The control aims at maintaining a constant level of the luminance and chromaticity of the light from the backlight unit. The setting part 203 determines reference values for feedback control. The references value can be pre-stored. The comparing part 204 compares the values detected by the optical sensor 201 with the reference values received from the setting part 203, and outputs the difference values. The adjusting part 205 determines the feedback amount to be fed back to the light source based on the difference values from the comparing part 204 and feedback coefficients. The feedback coefficients can be pre-stored. The operating part 206 operates the LED chips based on the output from the adjusting part 205. The light source control section 202 can be implemented by the use of a micro computer and software or by hardware configuration.

An operation example of the light source control section 202 will be described hereinafter. To clarify the description, the optical sensor 201 in this example comprises three optical sensor elements with a bandpass filter corresponding to each of red, green, and blue light. The values detected by each of the optical sensor elements are input to the light source control section 202. Necessary conversion for data processing is made to the detected values. The comparing part 204 determines the difference values between the values detected by each optical sensor element and the reference values for each optical sensor element received from the setting part 203, and output the results to the adjusting part 205. The adjusting part 205 has the feedback coefficients to associate the difference values between the detected values and the reference values of each optical sensor element with the feedback amount to be fed back to each of the LED chips. Based on the difference values received from the comparing part 204, the adjusting section 205 determines the feedback amount to be fed back so that the detected values of each optical sensor element approaches the reference values. The operating part 206 controls the luminance of the light from each LED chip according to the feedback amount received from the adjusting part 205.

Figure 3:
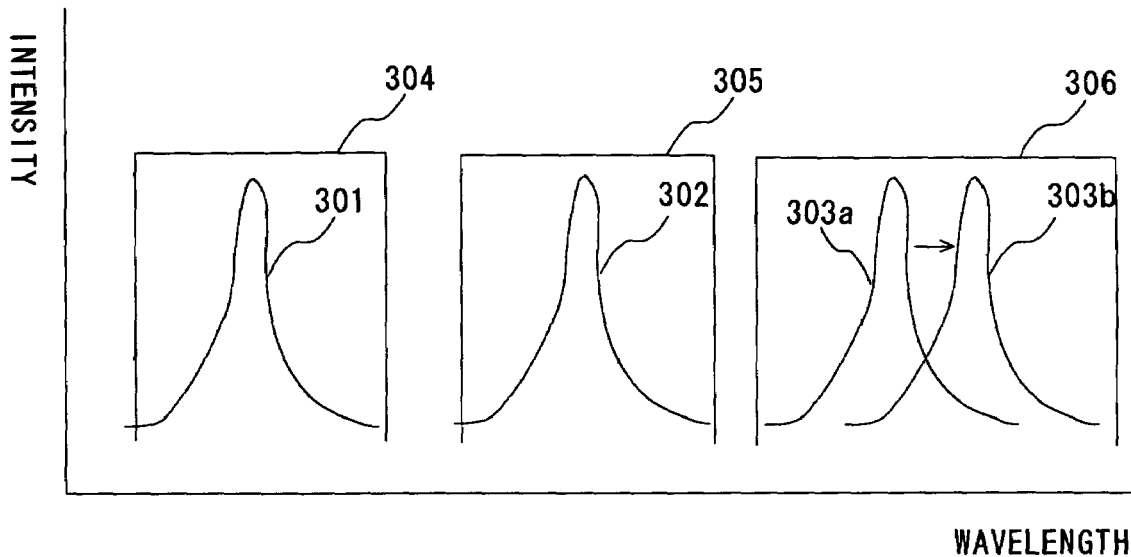
FIG. 3 is a view to explain optical properties of the light source unit according to the first embodiment of the present invention.

FIG. 3 is a view to show an example of the relationship between a detectable wavelength range of the optical sensor 201 and a wavelength of light emitted by the light source 106. To clarify the description, it shows the optical sensor comprising optical sensor elements, each of which having a sharp bandpass filter corresponding to each of R, G, and B color light. FIG. 3 shows only an example, and the relationship between the optical sensor and the wavelength of light from the light source according to this invention is not limited to those shown in the figure. In FIG. 3, the x-axis is wavelength of light, and the y-axis is relative intensity of light. Curves 301, 302, and 303 show the relationships between the wavelength and intensity of the light emitted by different types of LED chip. Curves 304, 305, and 306 show the relationships between the detectable wavelength range and detection sensitivity of optical sensor elements of the optical sensor 202. LEDs have such characteristics that emission wavelength as well as luminance change with temperature.

The relationship between a change in LED emission characteristics with temperature and the optical sensor will be described hereinafter using a simple example. The LED chip whose emission characteristics are as shown by the curves 303 emits the light shown by 303a at certain temperature and the light shown by 303b at another temperature. The light 303 from the light source is detected by the optical sensor element corresponding to the curve 306. Though the optical sensor element corresponding to the curve 306 can detect the change in the intensity of light 303, it cannot detect the wavelength shift from 303a to 303b. Hence, it detects the same value if the light 303a and 303b have the same intensity. Accordingly, when the chromaticity of the light source unit changes by the wavelength shift, the optical sensor cannot detect the change accurately. If the luminosity curve of the optical sensor is not the same as the human luminosity curve like the optical sensor with the bandpass filter, the results of detection differ between the sensor and the human eyes when the spectrum of the light source changes.

The light source unit according to this embodiment has the temperature control section 207 for controlling the temperature of the light source 106. The temperature control section 207 is a feedback control system. Maintaining the light source 106 at a given temperature level or levels prevents the spectrum of the LED chips from changing with temperature, and thus easily suppresses changes in the luminance or chromaticity of the light source unit. The given temperature level may be a specific temperature value or temperature range. The temperature control section 207 controls the temperature of the light source based on the value detected by the temperature sensor 210. A thermocouple or thermistor, for example, may be used for the temperature sensor 210. The temperature sensor 210 comprises an adequate number of temperature sensor elements positioned adequately to effectively detect the temperature of the light source. The same or different temperatures can be set to the temperature sensor elements.

The temperature control section 207 cools and/or heats the light source 106 using the cooling/heating part 208. A cooling fan, electric heater, peltier element, for example, maybe used for the cooling/heating part 208. The cooling/heating part 208 may have both of or either one of cooler and heater according to need. The cooling/heating part 208 comprises an adequate number of coolers and/or heaters positioned adequately to effectively control the temperature of the light source.

The temperature value detected by the temperature sensor 210 is input to the controller 209. The controller 209 stores set temperature values or temperature ranges. Based on the detected temperature value and the set temperature value, the controller 209 controls the cooling/heating part 208 so that the detected temperature value approaches a given value or falls within a given range.

This embodiment of the present invention allows suppression of spectrum changes of LED chips by controlling the temperature of the light source comprising LED chips. The luminance and chromaticity of the light source unit are thereby effectively kept to a constant level.

Second Embodiment

Figure 4:
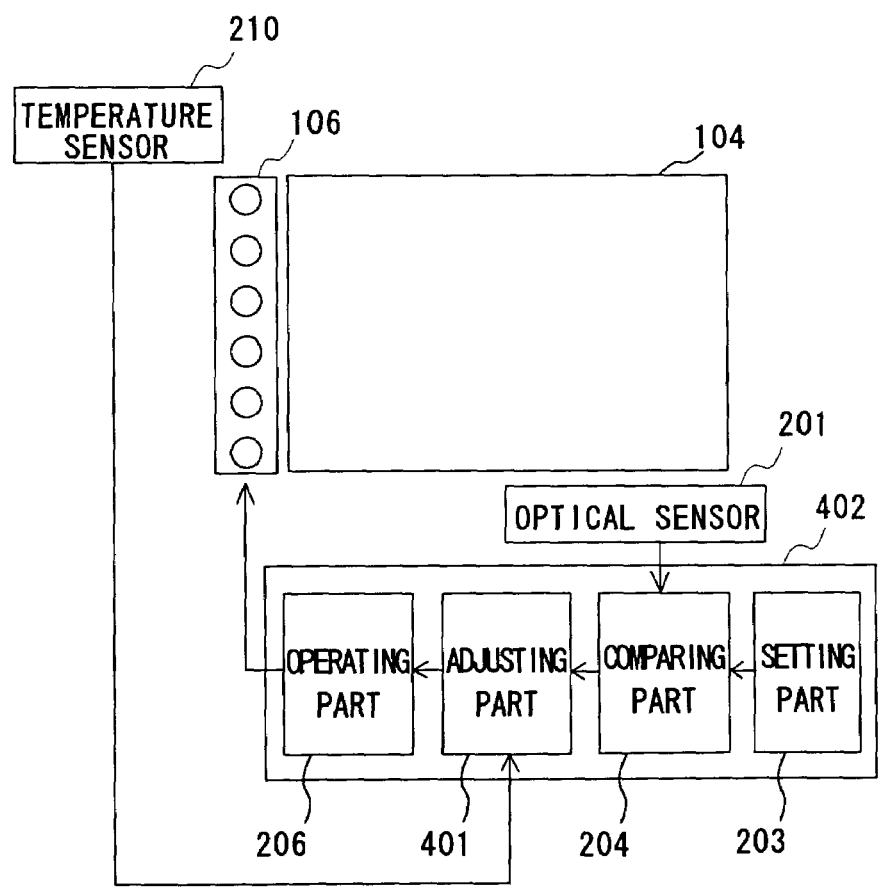
FIG. 4 is a block diagram showing a schematic structure of a light source unit according to the second embodiment of the present invention.

FIG. 4 is a view to explain a schematic structure of a light source unit according to the second embodiment of the present invention. In FIG. 4, the same reference symbols as in FIG. 2 designate the same elements and redundant description will be omitted. The light source unit according to this embodiment does not have the temperature control section 207 shown in FIG. 2. The light source unit in FIG. 4 has a light source control section 402 including an adjusting part 401. The adjusting part 401 determines the feedback amount for controlling the light source 106 based on the value detected by the temperature sensor 210. The adjusting part 401 pre-stores different feedback coefficients or calculates different feedback coefficients corresponding to temperature values. Each of the feedback coefficients is associated with each of different temperature values or temperature ranges. The light source unit is controlled by the feedback control based on the temperature of the light source so as to prevent the chromaticity of the light source unit from changing with temperature.

Each feedback coefficient associated with temperature is determined based on the spectral sensitivity characteristics of the optical sensor and the spectrum changes of LED chips with temperature and set to keep the emission chromaticity of the light source unit substantially constant under different temperature. The adjusting part 401 may have a table where the feedback coefficients are associated with detection values. The table may associate given temperature values or temperature ranges with the feedback coefficients. The table may be created using actual measured values or linear interpolation between measured value points. The adjusting part 401 can calculate feedback coefficients for the temperature not stored in the table by linear interpolation, for example.

The temperature sensor 210 detects the temperature of the light source 106 and outputs a detected value. The temperature sensor 210 can also detect the temperature values at different positions of the light source 106, and the LED chips can be controlled based on the temperature values. Receiving the detected temperature value, the adjusting part 401 determines a feedback coefficient based on the value in reference to the table. The adjusting part 401 then determines the feedback amount based on the value received from the comparing part 204 and the feedback coefficient determined based on the temperature of the light source. The feedback amount is input to the operating part 206. Based on the variable, the operating part 206 controls the luminance of each LED chip. Each of the LED chips therefore has the luminance corresponding to the value detected by the temperature sensor. Changes in chromaticity of the light source unit due to changes in temperature are thereby effectively suppressed.

Since this embodiment sets the feedback amount for controlling the light source based on the temperature of the light source, the emission chromaticity of the light source unit remains substantially constant when the spectrum of the LED chips changes with temperature.

Instead of the adjusting part 401, the setting part 203 may output different set values according to temperature to suppress chromaticity changes with temperature. The setting part 203 pre-stores different reference values or calculates different reference values corresponding to temperature. Each of the reference values is associated with each of different temperature values or temperature ranges. The setting part 203 receives the value detected by the temperature sensor 210 and determines a reference value based on the value. Like the adjusting part 401, the setting part 203 may have a table to output the reference value associated with the temperature of the light source. The light source unit according to this embodiment may further have a temperature control section. By adjusting the luminance of the light source elements according to changes in the temperature of the light source, the emission chromaticity of the light source unit remains constant when the spectrum of the light source elements changes with temperature.

Third Embodiment

Figure 5:
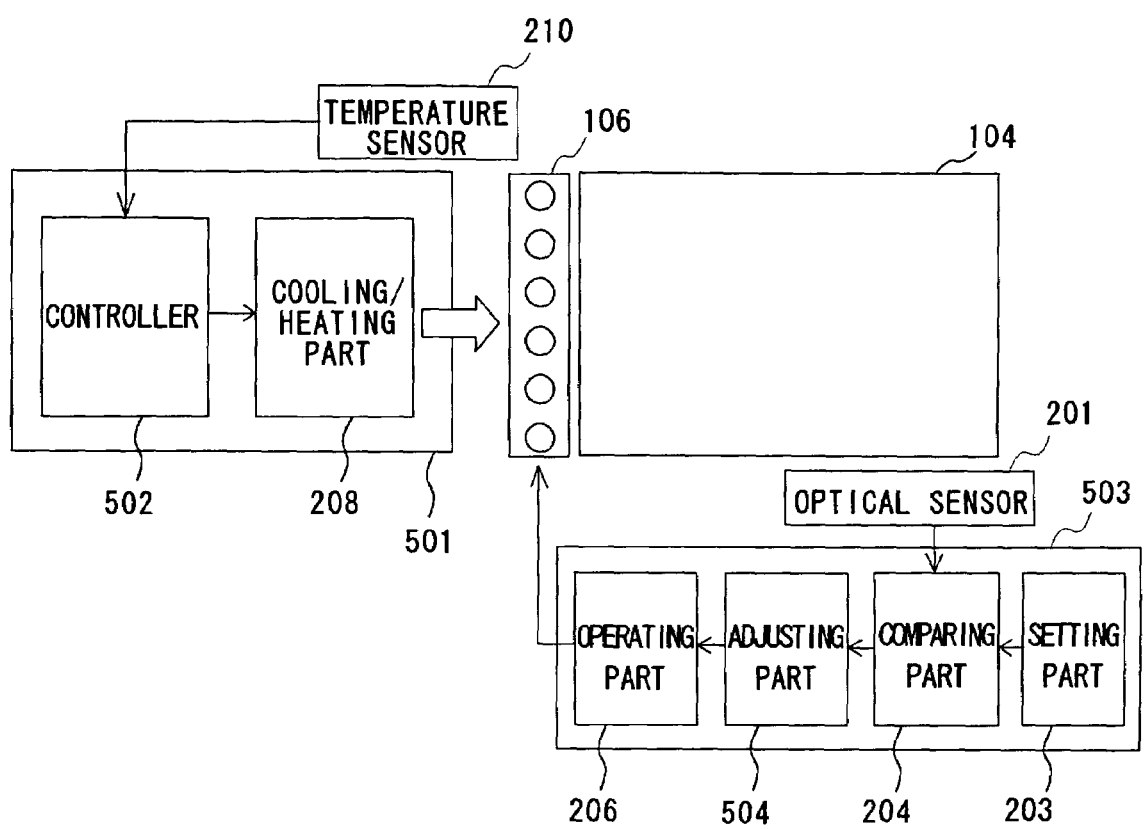
FIG. 5 is a block diagram showing a schematic structure of a light source unit according to the third embodiment of the present invention.

FIG. 5 is a view to explain a schematic structure of a light source unit according to the third embodiment of the present invention. In FIG. 5, the same reference symbols as in FIG. 2 designate the same elements and redundant description will be omitted. The light source unit in FIG. 5 has a temperature control section 501 for controlling the light source 106 according to different temperature. The temperature control section 501 includes the cooling/heating part 208 and a controller 502. The cooling/heating part 208 has the same structure as the one in the first embodiment. The controller 502 can change the set temperature of the light source 106. For example, it controls the cooling/heating part 208 so that the temperature of the light source 106 approaches a selected one of a plurality of different specific temperature values or temperature ranges.

For example, when the outside temperature rises and the light source 106 is unable to maintain the first temperature, the controller 502 controls the cooling/heating part 208 to keep the light source 106 at the second temperature which is higher than the first one. The controller 502 pre-stores a plurality of specific controllable temperature values or temperature ranges for the light source 106. It may have a table where the temperature values detected by the temperature sensor 210 are associated with the controllable temperature. The set temperature may be a specific temperature value or temperature range.

The light source unit according to this embodiment also has the light source control section 503 which includes the adjusting part 504. The adjusting part 504 determines the feedback amount for controlling the light source 106 based on the set temperature determined by the controller 502. The adjusting part 504 pre-stores different feedback coefficients or calculates different feedback coefficients corresponding to temperature. Each of the feedback coefficients is associated with each of the set temperature values or temperature ranges. The feedback coefficients are determined based on spectrum changes of LED chips with temperature, and set to keep the emission chromaticity of the light source unit substantially constant under different temperature. The adjusting part 504 may have a table where the feedback coefficients are associated with the set temperature values determined by the controller 502. The table may be created using actual measured values or linear interpolation between measured value points.

The temperature sensor 210 detects the temperature of the light source 106 and outputs the result. Receiving the detected temperature value, the controller 502 determines the set temperature value or temperature range corresponding to the detected value. The set value or range may be determined in reference to the preset table. The controller 502 controls the cooling/heating part 208 so that the detected temperature value approaches the set temperature value or falls within the set temperature range. The controller 502 then sends the set temperature value to the adjusting part 504. Receiving the set temperature value, the adjusting part 504 determines a feedback coefficient based on the value. The feedback coefficient may be determined in reference to the preset table. The table has the feedback coefficients associated with the set temperature values or temperature ranges. The feedback coefficients are set so that the chromaticity of the light source unit remains constant under different temperature.

The adjusting part 504 may determine the feedback coefficient based on the temperature value detected by the temperature sensor instead of based on the set temperature determined by the controller. In this case, the adjusting part 504 sets a plurality of feedback coefficients which correspond to the values detected by the temperature sensor.

Instead of the adjusting part 504, the setting part 203 may output different set values according to the set temperature determined by the controller to suppress chromaticity changes with temperature. The setting part 203 pre-stores different reference values or calculates different reference values corresponding to the set temperature values. Each of the reference values is associated with each of the set temperature values or temperature ranges sent from the controller 502. The setting part 203 receives the set temperature value from the controller 502 and determines a reference value based on the set value. The setting part 203 may output the reference value associated with the temperature of the light source using a table, for example. The temperature sensor 210 may comprise an adequate number of temperature sensor elements positioned adequately to effectively detect the temperature of the light source. The temperature sensor 210 can detect the temperature values at different positions of the light source 106, and the LED chips can be controlled based on the temperature values.

As described above, this embodiment changes the set temperature value for a light source comprising a plurality of light source elements and controls the light source elements to emit light with the luminance corresponding to the set temperature value. It thereby effectively controls the temperature of the light source and maintains the chromaticity of the light source unit at a constant level.

The present invention is not restricted to the above embodiments, but applicable to various light source units. For example, it may be applied to a light source unit having two light guide plates: one for emitting light toward a display panel and the other for mixing the light from a plurality of LEDs. Further, the present invention is not limited to be applied to light source units of display devices, but is also applicable to light source units for various uses.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A flat light source unit comprising:
   a light source comprising a plurality of light source elements for emitting different wavelengths of light;
   temperature control means including a cooling device for keeping the light source at constant temperature;
   a light mixer for mixing light emitted by the plurality of light source elements;
   a light detector for detecting light from the light mixer capable of detecting a plurality of different wavelengths of light; and
   light source control means for controlling luminance of each of the plurality of light source elements kept at a constant temperature by the temperature control means, based on values detected by the light detector so that the flat light source unit has substantially constant chromaticity, wherein the temperature control means controls the temperature of the light source independently of the control of the light source by the light source control means.

2. A flat light source unit according to claim 1, wherein the light detector detects a plurality of different wavelength ranges, and the light source control means controls luminance of each of the plurality of light source elements so that each detected value in the plurality of wavelength ranges approaches each given value.

3. A flat light source unit according to claim 1, further comprising a temperature detector for detecting temperature of the light source, wherein the temperature control means operates so that a value detected by the temperature detector approaches a given value.

4. A flat light source unit according to claim 1, further comprising a temperature detector for detecting temperature of the light source, wherein the temperature control means changes a temperature value to be maintained in the light source based on a temperature value detected by the temperature detector, and the light source control means controls each of the plurality of light source elements to have luminance corresponding to the temperature value to be maintained.

5. A flat light source unit according to claim 1, wherein the light source comprises a plurality of light source elements emitting light with wavelengths corresponding to each of N (N is a natural number) number of colors, the light detector comprises N number of optical sensors corresponding to each of N number of colors, and the light source control means controls each of the plurality of light source elements so that each value detected by the N number of optical sensors approaches each given value.

6. A display device comprising:
   a flat light source unit; and
   a display panel for displaying images by controlling light emitted by the flat light source unit;
   the flat light source unit comprising:
   a light source comprising a plurality of light source elements for emitting different wavelengths of light;
   temperature control means including a cooling device for keeping the light source at constant temperature;
   a light mixer for mixing light emitted by the plurality of light source elements;
   a light detector for detecting light from the light mixer capable of detecting a plurality of different wavelengths of light; and
   light source control means for controlling luminance of each of the plurality of light source elements kept at a constant temperature by the temperature control means, based on values detected by the light detector so that the flat light source unit has substantially constant chromaticity, wherein the temperature control means controls the temperature of the light source independently of the control of the light source by the light source control means.

7. A flat light source unit according to claim 1, wherein the temperature control means includes a heating device.

8. A display device according to claim 6, wherein the temperature control means includes a heating device.

9. A flat light source unit comprising:
a light source comprising a plurality of light source elements for emitting different wavelengths of light;
temperature control means including a cooling device for keeping the light source at a substantially constant temperature;
a light mixer for mixing light emitted by the plurality of light source elements;
a light detector for detecting light from the light mixer capable of detecting a plurality of different wavelengths of light; and
light source control means for controlling luminance of each of the plurality of light source elements kept at a substantially constant temperature by the temperature control means, based on values detected by the light detector so that the flat light source unit has substantially constant chromaticity, wherein the temperature control means controls the temperature of the light source independently of the control of the light source by the light source control means.

10. A display device comprising:
a flat light source unit; and
a display panel for displaying images by controlling light emitted by the flat light source unit;
the flat light source unit comprising:
a light source comprising a plurality of light source elements for emitting different wavelengths of light;
temperature control means including a cooling device for keeping the light source at a substantially constant temperature;
a light mixer for mixing light emitted by the plurality of light source elements;
a light detector for detecting light from the light mixer capable of detecting a plurality of different wavelengths of light; and
light source control means for controlling luminance of each of the plurality of light source elements kept at a substantially constant temperature by the temperature control means, based on values detected by the light detector so that the flat light source unit has substantially constant chromaticity, wherein the temperature control means controls the temperature of the light source independently of the control of the light source by the light source control means.

11. A flat light source unit according to claim 9, wherein the temperature control means includes a heating device.

12. A light source unit according to claim 10, wherein the temperature control means includes a heating device.

* * * * *